United States Patent
Amaudruz et al.

(10) Patent No.: US 9,203,618 B2
(45) Date of Patent: Dec. 1, 2015

(54) INFORMATION THEORETIC SECURITY MECHANISMS USING A TIME-VARYING KEY

(75) Inventors: Aurore Amaudruz, Vaud (CH); Olivier Dousse, Vaud (CH); Emre Teletar, Vaud (CH); Olivier Lévêque, Vaud (CH)

(73) Assignee: Nokia Technologies Oy, Espoo (FI)

( * ) Notice: Subject to any disclaimer, the term of this patent is extended or adjusted under 35 U.S.C. 154(b) by 745 days.

(21) Appl. No.: 12/816,687

(22) Filed: Jun. 16, 2010

(65) Prior Publication Data

US 2011/0311049 A1 Dec. 22, 2011

(51) Int. Cl.
*H04L 29/06* (2006.01)
*H04L 9/08* (2006.01)

(52) U.S. Cl.
CPC .............. *H04L 9/0891* (2013.01); *H04L 9/088* (2013.01)

(58) Field of Classification Search
None
See application file for complete search history.

(56) References Cited

U.S. PATENT DOCUMENTS

| | | | | |
|---|---|---|---|---|
| 6,920,563 | B2* | 7/2005 | Kohl et al. | 713/189 |
| 7,400,732 | B2* | 7/2008 | Staddon et al. | 380/278 |
| 7,929,701 | B1* | 4/2011 | Sprunk et al. | 380/277 |
| 2006/0280307 | A1* | 12/2006 | Ikushima et al. | 380/277 |
| 2010/0332820 | A1* | 12/2010 | Matsushima et al. | 713/150 |

* cited by examiner

*Primary Examiner* — Joseph P Hirl
*Assistant Examiner* — Leynna Truvan
(74) *Attorney, Agent, or Firm* — Harrington & Smith

(57) ABSTRACT

In one exemplary embodiment, a method includes: storing a key on a storage medium of a first apparatus, where a value of the key varies over time, where the key is configured to enable decryption of encrypted information; and sending a plurality of communications from the first apparatus to a second apparatus, where each communication comprises at least one portion of the key, where no single communication comprises an entirety of the key. In further exemplary embodiments, the encrypted information is encrypted in accordance with a threshold-based encryption scheme having a threshold such that the encrypted information is configured to be decrypted only if a decryptor is in possession of sufficient accurate portions of the key as compared to the threshold.

23 Claims, 4 Drawing Sheets

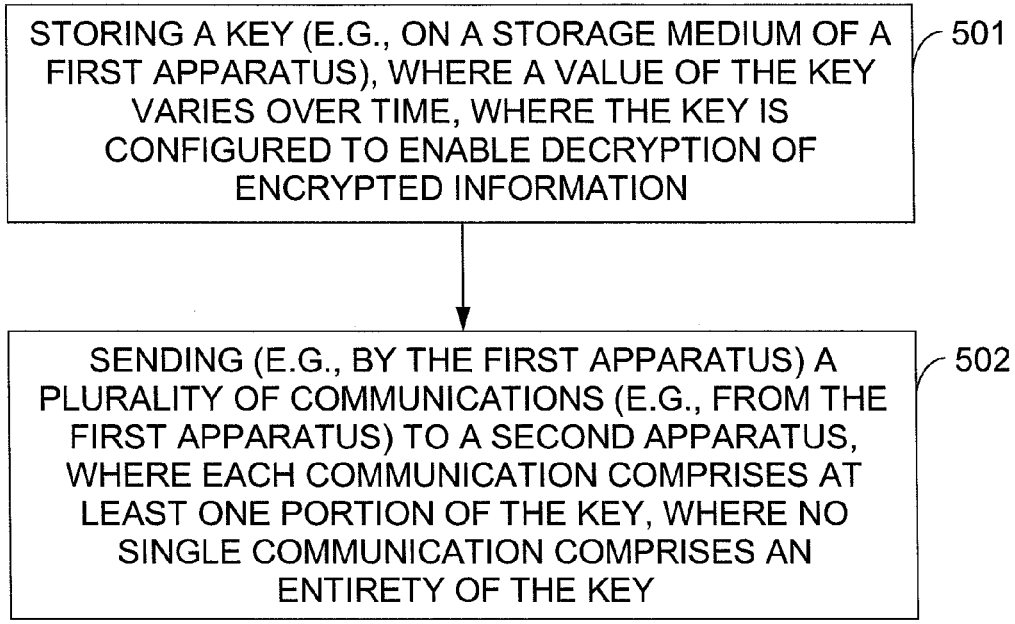

INFORMATION THEORETIC SECURITY MECHANISMS USING A TIME-VARYING KEY

TECHNICAL FIELD

The exemplary and non-limiting embodiments of this invention relate generally to communication systems, apparatus, methods and computer program products and, more specifically, relate to key-based security techniques.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

In recent times, as Internet access has become more prevalent and less expensive, usage of electronic communications and media for the purposes of sharing and social networking has increased. For example, it is now common for users to share content and information online in realtime. Concomitant with this, there has been an increasing tendency to share personal information and communications online. Many tools have been developed in order to facilitate such sharing, including, as non-limiting examples: forums, blogs, wikis, open-source development projects and social networking sites. For example, there are numerous online social network sites enabling users to build networks of "friends" by making connections through previously known or unknown individuals.

While more traditional real-world friendships are characterized by regular interactions, such as physical meetings, conversations or exchange of messages, online friendships may be characterized in other manners. For example, connections can be formed with a previously-unknown audience or persons by mere publication, such as on a blog, forum (message board) or wiki.

In social networking sites, privacy control features are commonly offered. Generally, these privacy settings must be manually set and controlled. For example, in one's network of "friends," the content available (e.g., profile, personal information, contact information, photos, videos, messages) has to be manually protected (e.g., manually set by the user) should the user not wish for the content to be publicly available (e.g., to the network at large, to the user's personal network of friends). The creation of such limited access groups (e.g., one or more groups of persons permitted to view the content) is possible, but they are not deduced or provided by the system directly. Basically, a user has to manually define these levels of access and trust.

In addition, the evolution of friendships is not taken into account by these social networks. For example, changes in access to content must be made manually by the user. That is, there are no further conditions on access.

SUMMARY

The below summary section is intended to be merely exemplary and non-limiting.

In one exemplary embodiment of the invention, a method comprising: storing a key on a storage medium of a first apparatus, where a value of the key varies over time, where the key is configured to enable decryption of encrypted information; and sending a plurality of communications from the first apparatus to a second apparatus, where each communication comprises at least one portion of the key, where no single communication comprises an entirety of the key.

In another exemplary embodiment of the invention, an apparatus comprising: at least one processor; and at least one memory including computer program code, the at least one memory and the computer program code being configured to, with the at least one processor, cause the apparatus at least to perform: storing a key, where a value of the key varies over time, where the key is configured to enable decryption of encrypted information; and sending a plurality of communications from the apparatus to another apparatus, where each communication comprises at least one portion of the key, where no single communication comprises an entirety of the key.

In a further exemplary embodiment of the invention, a method comprising: receiving, by a second apparatus, a plurality of communications from a first apparatus, where each communication comprises at least one portion of a key, where a value of the key varies over time, where the key is configured to enable decryption of encrypted information, where no single communication comprises an entirety of the key; and determining, by the second apparatus, a local version of the key based on the received portions of the key.

In another exemplary embodiment of the invention, an apparatus comprising: at least one processor; and at least one memory including computer program code, the at least one memory and the computer program code being configured to, with the at least one processor, cause the apparatus at least to perform: receiving a plurality of communications from another apparatus, where each communication comprises at least one portion of a key, where a value of the key varies over time, where the key is configured to enable decryption of encrypted information, where no single communication comprises an entirety of the key; and determining a local version of the key based on the received portions of the key.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 5 depicts a flowchart illustrating one non-limiting example of an exemplary method and execution of an exemplary computer program for practicing the exemplary embodiments of this invention; and FIG. 6 depicts a flowchart illustrating another non-limiting example of an exemplary method and execution of an exemplary computer program for practicing the exemplary embodiments of this invention.

DETAILED DESCRIPTION

Figure 1:
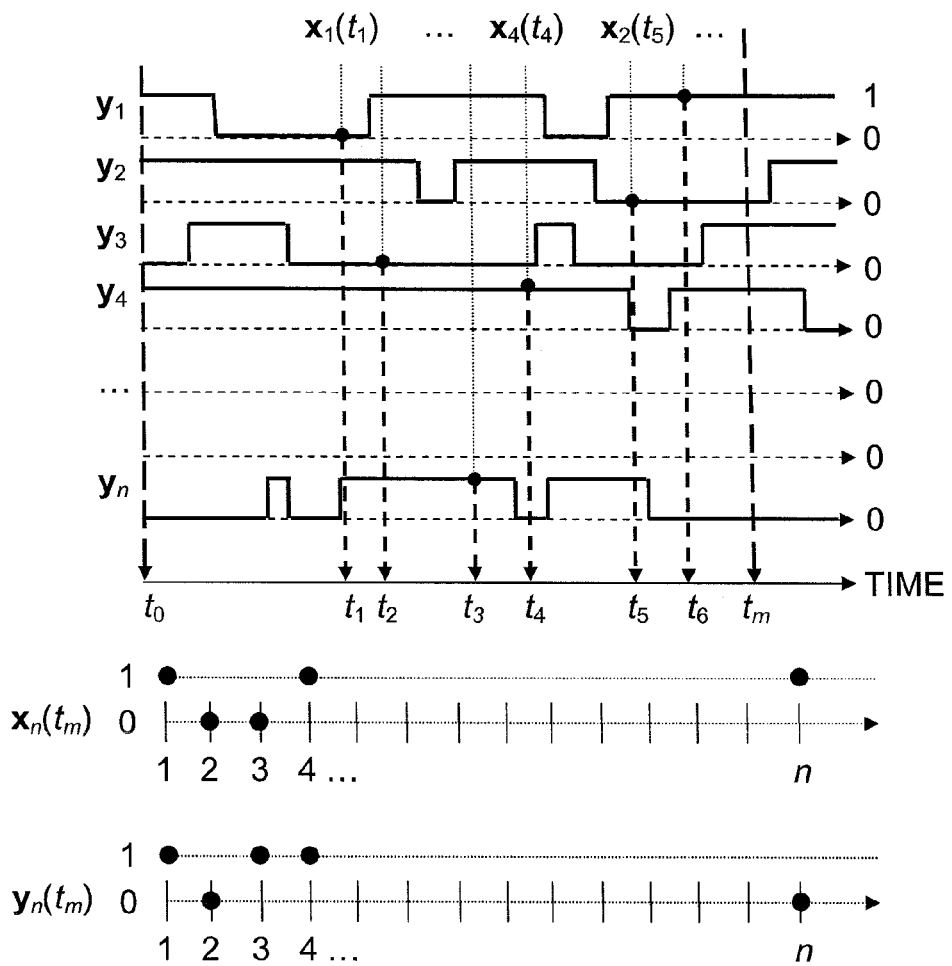
FIG. 1 is a graph that shows an exemplary time-evolving binary key $y_n(t)$ in accordance with the exemplary embodiments of the invention.

Conventional social networks, such as Facebook® or MySpace®, for example, enable users to create online profiles and upload personal content while sharing personal information with a vast network of friends and, often, an unknown number of strangers. In view of the above-noted lack of automatic controls, there is a relatively high risk for potential attacks on various aspects of the privacy environment since few users manually control their privacy settings to limit access to personal information and shared content. Thus, it would be desirable to provide improvements for communication and social networks, as non-limiting examples, that can automatically control privacy settings without requiring manual control and oversight by a user.

Exemplary embodiments of the invention relate to the evolution of friendships, the evolution of the level of trust a user has in his so called online "friends" and how such a level of trust can be deduced (e.g., automatically) by the system. Exemplary embodiments of the invention aim to free users from having to manually define and control privacy settings in order to ensure that they reflect the user's current relationships and interactions with online friends.

In accordance with the exemplary embodiments of the invention, privacy control features and settings are deduced (e.g., determined, inferred) automatically by the system. In order to accomplish this, the system may define a current level of "trust" as being proportional to interactions people have in such networks. As an example, a number of interactions can be measured based on communications occurring between the individuals in questions, such as e-mail exchanges, shared photos and online chat conversations (e.g., instant messaging), as non-limiting examples. Based on these interactions, the exemplary system infers a level of trust (e.g., as relating to access) that the user has in the other individual.

In accordance with the exemplary embodiments of the invention, a user maintains a key that is used to encrypt information that is subsequently distributed and/or shared with one or more peers (e.g., trusted peers, individuals within the user's personal network, the set of peers with whom the user interacts sufficiently often). The key/encryption is used to provide privacy control. Furthermore, the key evolves (e.g., changes) slowly over time. Pieces of the key are distributed to peers (e.g., automatically) based on and/or with social interactions (e.g., as an attachment to an e-mail, as an attachment or automatic download during online chat). Since the key evolves over time, old pieces lose their usefulness with time such that more recent interactions provide more valuable (e.g., useful) pieces of the key.

The exemplary encryption scheme is built such that anyone (e.g., any peer) having enough correct pieces of the key (e.g., current or recent pieces of the key) is able to decrypt the information. In contrast, peers with too many incorrect pieces (e.g., fewer, older pieces) are unable to retrieve (decrypt) the information.

The exemplary mechanism discussed here is based on a time-evolving key. As an example, the key may be generated as follows. For the key, a random binary vector $y_n(t)$ of length n is generated with its current value denoted for a time t. For example, the initial value of the key is $y_n(t_0)$ at the initial time of $t_0$. The bits of this vector are then flipped independently of one another as time progresses. The bit-flipping pattern for each bit is modeled by a Poisson point process of rate $\lambda$. That is, the intervals between bit flips are independent and identically distributed and exponentially distributed.

The time instants at which users have (e.g., social) interactions (i.e., interactions between the key holder and a peer) are also modeled with a Poisson point process, but with parameter $\mu$. At the times of these interactions, the key holder discloses at least one randomly chosen bit of the current value of the key to the receiver along with an identification of the at least one bit (e.g., the bit's location within the key, an index of the bit). Interactions between the key holder and the peer are independent from one another for the disclosed bits of the key. As time goes on, the receiver collects the bits and uses them to estimate the true value of the key $y_n(t)$. Note that if the receiver receives information for the same bit twice, only the most recent value is relevant since the evolution of the key is Markovian. The receiver maintains a vector $x_n(t)$ with the values of the bits exchanged during the most recent interactions together with a vector T containing the time of those interactions. The vector T is tracked in order to enable computation of the probability that a bit is incorrect or wrong (e.g., the probability of error for each bit is a function of time, such as the time since the last interaction, as described further below).

Thus, in this example $y_n(t)$ is the binary vector, stored by the key holder, defining the key such that: $y_n(t)=(y_1(t), y_2(t), y_3(t), \ldots, y_n(t))$. Furthermore, in this example $x_n(t)$ is the binary vector, stored by the peer, defining the value of the key (i.e., the bits of the key) as of the most recent interaction $T_n=(T_1, T_2, T_3, \ldots, T_n)$ between the peer and the key holder such that $x_n(t)=(x_1(t), x_2(t), x_3(t), \ldots, x_n(t))$. $\mu$ is the frequency of interactions for each bit and $\lambda$ is the average time the bits are flipping (e.g., average period for bit-flipping).

FIG. 1 is a graph that shows an exemplary time-evolving binary key $y_n(t)$ in accordance with the exemplary embodiments of the invention. The key $y_n(t)$ has a length n (e.g., an integer, a number of bits) and evolves over time such that its value (e.g., the value of its individual bits, 0 or 1) is with respect to a certain time $t_m$. Over the course of various communications between the key holder and a peer, the key holder sends information about the key (e.g., at least one bit) at that time to the peer. As an example, for a communication occurring at a time $t_1$ between a first user (the key holder) employing a first key $y_1(t)$ and another user (the peer), the first user provides the other user with at least one randomly chosen bit of the key $y_1(t_1)$ at the time $t_1$. The other user maintains a vector $x_n(t)$ based on the received information, including the information $x_1(t_1)$ received at time $t_1$. The other user utilizes the vector $x_n(t)$, as constructed and refined based on the received information (e.g., $x_1(t_1), x_4(t_4), x_2(t_5)$, etc.), to (eventually) decrypt communication, content or other information provided by the first user (e.g., accessible online or provided via personal communication(s), as non-limiting examples).

For example, assume that the sender (the key holder) encrypts some message at a time $t_m$ using the key $y_n(t_m)$. The receiver (the other user, a peer) will try to decode the message using the stored vector $x_n(t_m)$ and will be successful if enough of the bits received during the interactions are still correct. FIG. 1 shows examples of $y_n(t_m)$ and $x_n(t_m)$. As can be seen, the peer's vector $x_n(t_m)$ may not be entirely accurate given the time-evolving nature of the key $y_n(t_m)$. Even so, the peer will be able to decrypt the encrypted message if enough bits of the peer's vector $x_n(t_m)$ are still correct.

As a non-limiting example, if the previous information for a certain bit were provided at time $t_1$ and the peer is attempting to decrypt the encrypted communication at a later time $t_2$, the bit will be correct when the receiver tries to decrypt the information at time $t_2$ only if an even number of flips (i.e., for the bit(s)/information in question) has happened in the interval $t_2-t_1$. Thus, the bit will be wrong if an odd number of flips has happened. This is equivalent to a binary symmetric channel of probability of error $P_e=\frac{1}{2}(1-e^{2\lambda \tau})$.

Figure 2:
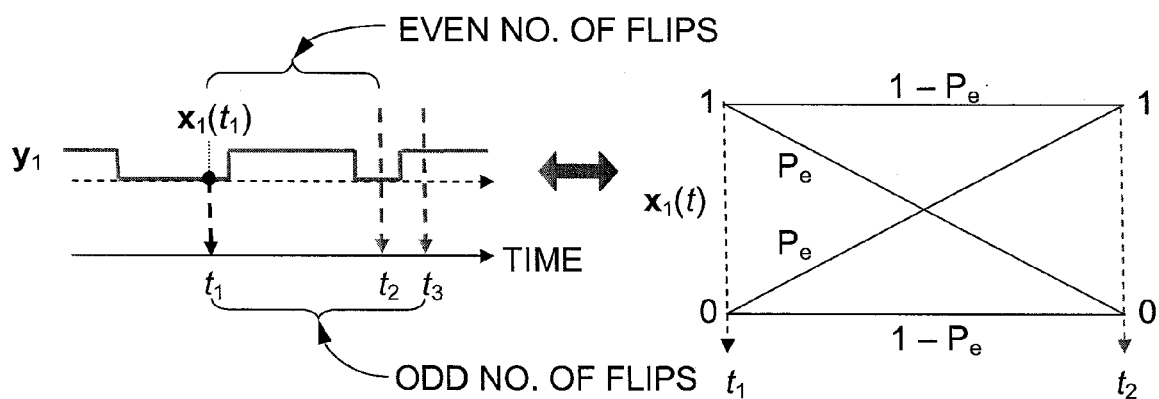
FIG. 2 illustrates an exemplary embodiment whereby a later decryption for a certain bit $y_1(t_2)$ will be correct if an even number or zero flips have occurred in the interval $(t_2-t_1)$ since the information was provided for the certain bit.

FIG. 2 illustrates an exemplary embodiment whereby a later decryption for a certain bit $y_1(t_2)$ will be correct if an even number of flips or zero flips have occurred in the interval ($t_2-t_1$) since the information was provided for the certain bit. The probability of error ($P_e$) is also shown in FIG. 2.

When the key size n is large, the amount of information about the key that the receiver knows can be computed as follows: $C=I(x(T), T; y(t_0))=\mu\ I'(0)=(\mu, c/\lambda)$, where c is a constant. $I(\bullet)$ is the mutual information that measures the amount of information that can be obtained on a random variable by observing another. The above relation means that the mutual information is proportional to the interaction rate $\mu$ and inversely proportional to the bit-flipping rate $\lambda$. Since all of the bits in the key are independent of each other, one can write: $C=I(x(T), T; y(t_0))=n*I(x_i(T_i), T_i; y_i(t_0))$ which is equivalent to $n*I(\mu/n)$. As n grows, one has: $I(\mu/n)/(\mu/n) \to \mu*I'(0)$ where $I'(0)$ is the first derivative of $I(\mu(n))$ in $\mu=0$. As non-limiting examples of suitable values, $\lambda$ can be 1 or 2. As further non-limiting examples of suitable values, $\mu$ can be 0 or 1.

As an example, a threshold decoding scheme may be used in conjunction with the exemplary embodiments of the invention. In a threshold decoding scheme (e.g., a threshold encryption scheme or system), a user with enough correct portions of the key (e.g., a number of correct portions equal to or above a certain threshold r) can decrypt the information. As an example, a user with at least g correct bits of an n-bit key can recover the whole (correct) key and/or decrypt the encrypted information (e.g., where g is an integer). As an example, the threshold r can be expressed as a minimum accuracy (e.g., percentage) of correct portions of the key required for recovery of the full key and/or correct decryption of the encrypted content/information. For example, r=g/n. In such a manner, a completely accurate version of the key is not needed by the peer in order to decode the information. Instead, the peer can use a key that is "correct enough" to decrypt the information as soon as it has enough correct portions (e.g., bits).

As one non-limiting example, consider the following threshold decoding scheme. When seeking to encode the information and subsequently publish it, the key holder computes the minimum distance from the key that the peer has acquired to the actual key. The key holder then defines the level of trust accordingly.

As another non-limiting example, the key holder could encode the information that is to be published with an error-correcting code (e.g., Reed-Solomon). At the time of publishing $t_0$, the key holder uses an exclusive OR (XOR) operation with the encoded information and the key at that time to obtain the message that is then published. The peer accesses the published message and uses a XOR operation with the peer's version of the key. If the peer has enough correct bits of the key, the peer will be able to recover the original message that was encoded. The level of trust can be adjusted by encoding the information differently.

Linear coding and decoding schemes may be used for the key. Thus, in at least some cases the peer would have to be aware of the threshold in use. Since the bits of the time-varying key are constantly flipping over time, the peer can only increase the chance of success (i.e., the chance of correctly decrypting the information) with a higher number of interactions (e.g., more interactions, recent interactions, more recent interactions).

The probability of error ($P_e$) is a function of time (T), a variable representing the time elapsed between the last interaction and the time at which the peer wishes to decrypt the information using the obtained key. As noted above, for a binary key/system the probability of error can be represented as the probability of error for a binary symmetric channel ($P_e=\frac{1}{2}(1-e^{2\lambda t})$) since the bits are flipping a number of times (e.g., at a rate) following a Poisson distribution of parameter $\lambda$. After a time T, a given bit will be correct or incorrect in view of information previously provided to the peer. As noted above in FIG. 2, the probability of error will be the probability that an odd number of flips have occurred. For a given threshold encryption system/scheme in accordance with an exemplary embodiment of the invention, the threshold may be a static value.

Further to the probability of error $P_e$ noted and described above, one can also describe a probability of correctness $P_c$. The probability of correctness $P_c$ is simply the reverse of the probability of error $P_e$–a measure of the likelihood that the key obtained by the peer is correct. For example, assuming the probability of error is given as a percentage, one would have: $P_c=1-P_e$.

Based on the above description, and as a further example, consider a peer that has been interacting with the key holder and, at a current time $T_m$, wishes to decrypt the information. Let the key be an n-bit binary key. The exemplary peer is aware of the threshold r. For this example, let the threshold r be 60%, as in a peer having 60% or more correct portions (e.g., bits) of the key will be able to recover the entire key and/or successfully decrypt the information.

Before attempting the decryption, the peer computes the probability of error $P_e$ (and/or the probability of correctness $P_c$) for its current version of the key, for example, based on the time T that has passed between the last interaction and the current time $T_m$. If $(1-P_e)<r$, the peer knows that successful decryption is unlikely. In view of this knowledge, the peer may or may not attempt decryption. In contrast, if $(1-P_e) \geq r$, then the peer knows that successful decryption is likely. In such a case, the peer will probably continue onwards to attempt decryption of the information.

One can also express this in terms of the probability of correctness, for example, by stating that successful decryption is likely if $P_c \geq r$. In some cases, this interpretation may be more intuitive (e.g., since for $P_c$ being over or above the threshold is indicative of likely success).

Note that since the obtained key is based on imperfect knowledge (e.g., due to the continual flipping of the bits of the key), the computation of the probability of error by the peer is only an indication (e.g., a suggestion) of the likelihood of successful decryption. It is possible that a peer is unable to decrypt the information even if $(1-P_e) \geq r$. Similarly, it is possible that a peer is able to decrypt the information even if $(1-P_e)<r$.

In some exemplary embodiments, the probability of error $P_e$ further may be computed as a function of one or more of: a number of interactions between the peer and the key holder, $\mu$, an interrelation of the number of interactions and the times at which they occurred and/or some other measure of the "freshness" of the key information currently possessed by the peer.

The exemplary mechanism described with respect to the exemplary embodiments of the invention is a possible alternative to the manual approach currently available for controlling privacy settings in social networks, for example. This exemplary mechanism could infer the settings without the user having to manually select groups of people. While this exemplary solution does not take sharp changes of the "level of trust" into account, various techniques are available to overcome this. For example, a user could be allowed to manually specify privacy settings (e.g., for a certain peer or group of peers) if the user does not wish to wait the amount of time/interactions necessary for the peer(s) to construct an accurate model of the key. As another example, a manual override could enable a user to set a new key or modify (e.g., increase, decrease) the speed with which the key changes, for example, if the user wished to deny access to someone who previously had access (i.e., someone who previously had an accurate version of the key).

In further exemplary embodiments, additional interactions will enable recalculation of the key by the peer. In other exemplary embodiments, multiple peers may interact (e.g., receive information for) a single key. In such exemplary embodiments, the multiple peers may interact independently of one another. In further exemplary embodiments, a rate of change of the key is proportional (e.g., directly, inversely) to a number of peers who are receiving information about the key or who have received information about the key.

As non-limiting examples, the size n of the key may be 64 bits, 128 bits, 256 bits or any other suitable integer number of bits. As a non-limiting example, the number of bits p sent from the key holder to the peer (i.e., the portion of the key) may comprise $1 \le p < n$ per communication or message. In other exemplary embodiments, the key may not be binary and the individual elements of the key may be configured to take on one of l different values, such as one of ten different values (e.g., 0-9), one of twenty-six different values (e.g., A-Z), one of sixteen different values (e.g., hexadecimal, 0-F) or one of thirty-six different values (0-9 or A-Z), as non-limiting examples. In another exemplary embodiment, the key is a series of discrete integer values. In another exemplary embodiment, the key may comprise a series of bytes used to encode different letters or characters of an alphabet (e.g., a 256 letter alphabet).

In further exemplary embodiments, the encrypted information that the key decrypts (enables decryption of) comprises one or more of: a document, a file, a directory, a portion of a storage device (e.g., a hard drive, a disk), a web page, personal information, contact information, a blog, a diary, a journal, a message board, a wiki, a wild page, a wiki entry or information on a social networking site, as non-limiting examples.

Note that in accordance with various exemplary embodiments of the invention, the key holder may wish to regularly update the encryption (i.e., the encryption used to encrypt the information) with the latest version of the key so that a peer can decrypt the data as soon as the peer has a "correct enough" version of the key.

In further exemplary embodiments of the invention, the time-varying key may be utilized to provide tiered access to one or more encrypted items (e.g., information, files, web pages, etc.). That is, the threshold encryption scheme may include more than one threshold enabling different types of decryption (e.g., different access to the same or different encrypted information). For example, a first peer having a probability of correctness $P_c^1$ (or any other such measure of "key correctness") in the region of $r \le P_c^1 \le s$ may have access to content A and not content B, while a second peer having a probability of correctness $P_c^2$ in the region of $s < P_c^2 \le P_{max}$ (e.g., 100% correctness) may have access to content B or content A and content B. In such a manner, different levels of "trust" may correlate to different tiers or levels of access to the various information, for example, based on the frequency (e.g., number, timing, recent) of interactions with the key holder.

Figure 3:
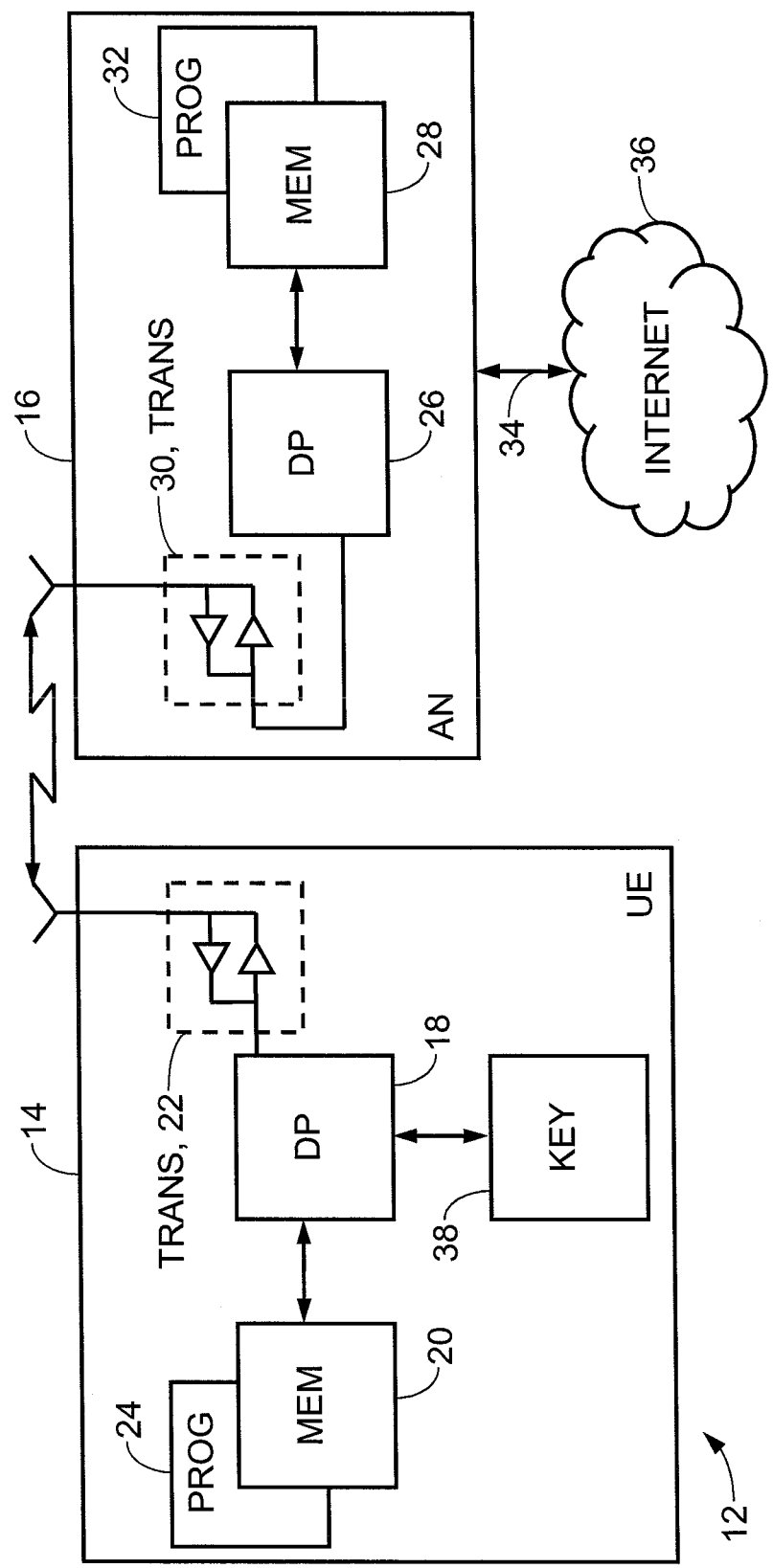
FIG. 3 illustrates a simplified block diagram of various exemplary electronic devices that are suitable for use in practicing the exemplary embodiments of this invention.

Reference is made to FIG. 3 for illustrating a simplified block diagram of various exemplary electronic devices that are suitable for use in practicing the exemplary embodiments of this invention. In FIG. 3, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has (e.g., is coupled to) at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for wireless communication with the UE 14. Note that the TRANS 30 has (e.g., is coupled to) at least one antenna to facilitate communication. The AN 16 is coupled via a data path 34 to one or more external networks or systems, such as the internet 36, for example.

At least one of the PROGs 24, 32 is assumed to include program instructions that, when executed by the associated DP 18, 26, enable the respective electronic device to operate in accordance with the exemplary embodiments of this invention, as discussed herein.

In general, the various exemplary embodiments of the UE 14 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

While described above in reference to memories (MEMS 20, 28), these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to data processors (DPs 18, 26), these components may generally be seen to correspond to processors, processing devices, processing components, processing blocks, circuits, circuit devices, circuit components, circuit blocks, integrated circuits and/or chips (e.g., chips comprising one or more circuits or integrated circuits).

It should be noted that the UE 14 shown in the wireless network 12 of FIG. 3 may be configured to act as the key holder, the peer or both a key holder and a peer (e.g., with respect to two different keys—one for itself and one for another key holder). In further exemplary embodiments, the wireless network 12 may include additional UEs (e.g., having similar components to the UE 14) that themselves act as a key holder or a peer in concert with the UE 14 that is shown. In other exemplary embodiments, the AN 16 may be configured to act as the key holder, the peer or both a key holder and a peer (e.g., with respect to two different keys—one for itself and one for another key holder). In further exemplary embodiments, the exemplary operations discussed herein may be embodied in one or more different entities. As a non-limiting example, if the UE 14 were configured to act as the key holder, the key may be stored in any suitable component of the UE 14. In some exemplary embodiments, the UE 14 may comprise one or more specialized components configured to store, process and/or perform operations on the key, such as a key holder (KEY) component 38. The KEY 38 may comprise one or more: processors, storage, memories, circuits/circuitry, programmable logic, integrated circuits, program storage devices and/or computer-readable mediums/memories, as non-limiting examples.

While described above in FIG. 3 in relation to a wireless communication system and wireless communications, the exemplary embodiments of the invention instead or in addition may be utilized in conjunction with wired communication systems and/or wired communications. While described above in relation to communications between two entities (e.g., point-to-point), the exemplary embodiments of the invention are not limited thereto and, in some exemplary embodiments, may be practiced in conjunction with other types of communications such as point-to-multipoint (e.g., broadcast, multicast, multimedia broadcast/multicast service), for example.

Figure 4:
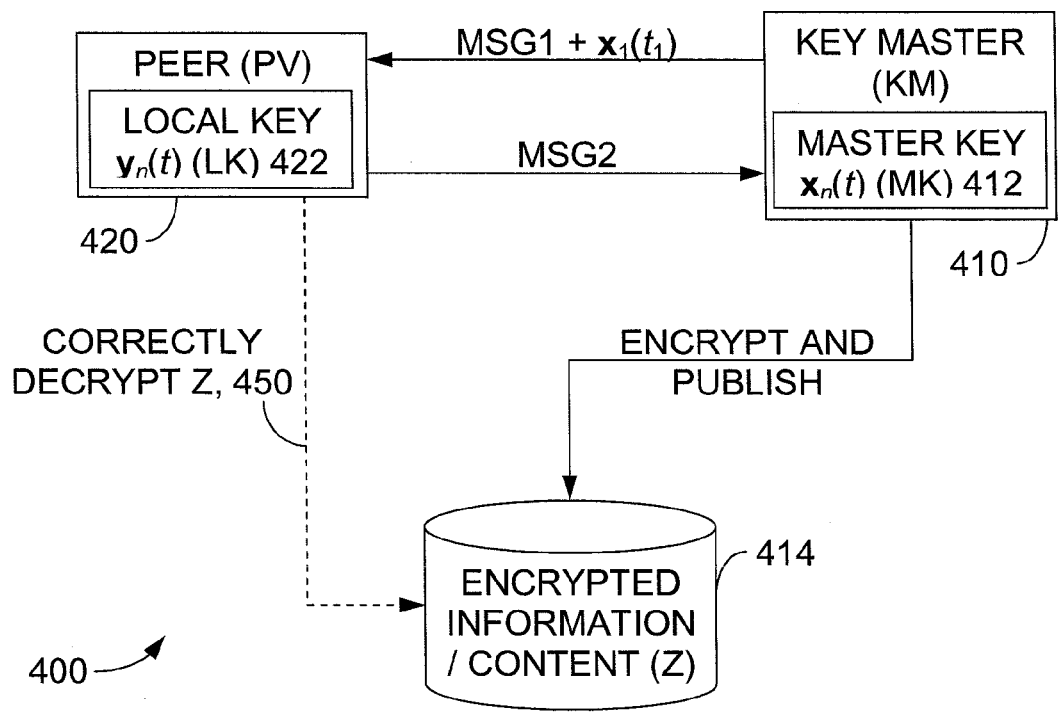
FIG. 4 illustrates an exemplary system in accordance with the exemplary embodiments of the invention.

FIG. 4 illustrates an exemplary system 400 in accordance with the exemplary embodiments of the invention. The system 400 includes a key master (KM) 410 that stores and/or maintains a master key $x_n(t)$ (MK) 412. The KM 410 uses the MK 412 to encrypt and publish information/content (Z) 414 in accordance with a threshold encryption scheme. As described herein, the MK 412 is a time-varying key. The KM 410 is in communication with a peer (PV) 420. Ultimately, the PV 420 desires to access Z 414 by correctly decrypting it 450. When communicating with the PV 420, the KM 410 not only sends information (e.g., a message, MSG1), but also sends a portion of the MK 412, represented in FIG. 4 as $x_1(t_1)$. Based on the received portions, the PV 420 constructs a local key $y_n(t)$ (LK) 422. The communication may be bilateral and, thus, the PV 420 may send information (e.g., another message, MSG2) to the KM 410.

The LK 422 is a version of the MK 412 that is based on the pieces of the MK 412. Since the MK 412 is time-varying, it is very likely that the LK 422 will be at least partially incorrect. As noted above, the accuracy of the LK 422 can be improved by the PV 420 receiving additional communications from the KM 410 with each communication including a portion of the MK 412. In some exemplary embodiments, the KM 410 may be the entity that stores the Z 414. In some exemplary embodiments, the KM 410 can check the level of trust by checking what the Hamming distance is to the current key. In other exemplary embodiments, the KM 410 can re-encrypt the Z 414 with a more recent version/value of the key (e.g., an amount of time after publishing the Z 414), for example, in order to allow new peers that have acquired pieces of the key after the initial publication to decrypt the Z 414.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

(1) In one exemplary embodiment, and with reference to FIG. 5, a method comprising: storing a key (e.g., on a storage medium of a first apparatus), where a value of the key varies over time, where the key is configured to enable decryption of encrypted information (501); and sending (e.g., by the first apparatus) a plurality of communications (e.g., from the first apparatus) to a second apparatus, where each communication comprises at least one portion of the key, where no single communication comprises an entirety of the key (502).

A method as above, where the key comprises a series of binary values. A method as in any above, where the key comprises a series of ordered values or a series of indexed values. A method as in any above, where the key comprises a series of values, where the at least one portion of the key comprises at least one value (of the key) and at least one indicator corresponding to a position of the at least one value within the key. A method as in any above, where the key is configured to enable the decryption of the encrypted information only if a decryptor is in possession of sufficient accurate portions of the key. A method as in any above, where the encrypted information is encrypted in accordance with a threshold-based encryption scheme having a threshold such that the encrypted information is configured to be decrypted only if a decryptor is in possession of sufficient accurate portions of the key as compared to the threshold. A method as in any above, where the key comprises a series of discrete integer values.

A method as in any above, where the key comprises a series of values. A method as in any above, where the storage medium comprises a memory, an integrated circuit or a computer-readable medium. A method as in any above, where the value of the key is updated to obtain an updated key, the method further comprising: re-encrypting the encrypted information based on the updated key. A method as in any above, where a frequency of the plurality of communications is indicative of a level of trust between the first apparatus and the second apparatus. A method as in any above, where a frequency of the plurality of communications is indicative of a level of trust between a (first) user of the first apparatus and a (second) user of the second apparatus. A method as in any above, where a frequency of the plurality of communications is indicative of a level defining an amount of content a (first) user of the first apparatus is willing to share with a (second) user of the second apparatus.

A method as in any above, where the at least one portion of the key is selected randomly. A method as in any above, where the key comprises a time-varying key. A method as in any above, where intervals between changes in elements of the key are independent and identically distributed and exponentially distributed. A method as in any above, where elements of the key are changed independently of one another over time. A method as in any above, where a pattern for change of each element of the key is modeled by a Poisson point process of rate λ. A method as in any above, where evolution (e.g., changing, varying, time-varying) of the key is Markovian. A method as in any above, where a size n of the key is 64 bits, 128 bits, 256 bits or an integer number of bits. A method as in any above, where the at least one portion of the key comprises a number of bits equal to 1≤p<n per communication. A method as in any above, where the encrypted information comprises at least one of: a document, a file, a directory, a portion of a storage device (e.g., a hard drive, a disk), a web page, personal information, contact information, a blog, a diary, a journal, a message board, a wiki, a wiki page, a wiki entry and information on a social networking site.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more additional aspects of the exemplary embodiments of the invention as described herein.

(2) In another exemplary embodiment, and with reference to FIG. 5, a program storage device readable by a machine, tangibly embodying a program of instructions executable by the machine for performing operations, said operations comprising: storing a key (e.g., on a storage medium of a first apparatus), where a value of the key varies over time, where the key is configured to enable decryption of encrypted information (501); and sending (e.g., by the first apparatus) a plurality of communications (e.g., from the first apparatus) to a second apparatus, where each communication comprises at least one portion of the key, where no single communication comprises an entirety of the key (502).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more additional aspects of the exemplary embodiments of the invention as described herein.

(3) In another exemplary embodiment, an apparatus comprising: at least one processor; and at least one memory including computer program code, the at least one memory and the computer program code being configured to, with the at least one processor, cause the apparatus at least to perform: storing a key, where a value of the key varies over time, where the key is configured to enable decryption of encrypted information; and sending a plurality of communications from the apparatus to another apparatus, where each communication comprises at least one portion of the key, where no single communication comprises an entirety of the key.

An apparatus as in any above, where the apparatus comprises a wireless device, a computer, a mobile phone, a node of a network or a node of a social network. An apparatus as in any above, further comprising one or more additional aspects of the exemplary embodiments of the invention as described herein.

(4) In another exemplary embodiment, an apparatus comprising: means for storing a key (e.g., on a storage medium of a first apparatus), where a value of the key varies over time, where the key is configured to enable decryption of encrypted information; and means for sending (e.g., by the first apparatus) a plurality of communications (e.g., from the first apparatus) to a second apparatus, where each communication comprises at least one portion of the key, where no single communication comprises an entirety of the key.

An apparatus as in any above, where the means for storing comprises a memory, a storage medium, a computer-readable storage medium, storage circuitry or an integrated circuit.

An apparatus as in any above, where the means for sending comprises a transmitter, a transceiver, a modem, transmission circuitry, an integrated circuit or a communications component. An apparatus as in any above, further comprising one or more additional aspects of the exemplary embodiments of the invention as described herein.

(5) In another exemplary embodiment, an apparatus comprising: storage circuitry configured to store a key (e.g., on a storage medium of a first apparatus), where a value of the key varies over time, where the key is configured to enable decryption of encrypted information; and transmission circuitry configured to send (e.g., by the first apparatus) a plurality of communications (e.g., from the first apparatus) to a second apparatus, where each communication comprises at least one portion of the key, where no single communication comprises an entirety of the key.

An apparatus as in any above, embodied as an integrated circuit. An apparatus as in any above, further comprising one or more additional aspects of the exemplary embodiments of the invention as described herein.

(6) In one exemplary embodiment, and with reference to FIG. 6, a method comprising: receiving (e.g., by a second apparatus) a plurality of communications from a first apparatus, where each communication comprises at least one portion of a key, where a value of the key varies over time, where the key is configured to enable decryption of encrypted information, where no single communication comprises an entirety of the key (601); and determining (e.g., by the second apparatus) a local version of the key based on the received portions of the key (602).

A method as above, where the key comprises a series of binary values. A method as in any above, where the key comprises a series of values, where the at least one portion of the key comprises at least one value and at least one indicator corresponding to a position of the at least one value within the key. A method as in any above, where the key is configured to enable the decryption of the encrypted information only if a decryptor is in possession of sufficient accurate portions of the key. A method as in any above, where the encrypted information is encrypted in accordance with a threshold-based encryption scheme having a threshold such that the encrypted information is configured to be decrypted only if a decryptor is in possession of sufficient accurate portions of the key as compared to the threshold. A method as in any above, further comprising: decrypting, by the second apparatus, the encrypted information using the determined local version of the key. A method as in any above, where the key comprises a series of discrete integer values.

A method as in any above, where decrypting comprises initially determining a value for a probability of error or a probability of correctness and comparing the determined value to a threshold. A method as in any above, where the key comprises a series of values. A method as in any above, where the key comprises a series of ordered values or a series of indexed values. A method as in any above, where a frequency of the plurality of communications is indicative of a level of trust between the first apparatus and the second apparatus. A method as in any above, where a frequency of the plurality of communications is indicative of a level of trust between a (first) user of the first apparatus and a (second) user of the second apparatus.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more additional aspects of the exemplary embodiments of the invention as described herein.

(7) In another exemplary embodiment, and with reference to FIG. 6, a program storage device readable by a machine, tangibly embodying a program of instructions executable by the machine for performing operations, said operations comprising: receiving (e.g., by a second apparatus) a plurality of communications from a first apparatus, where each communication comprises at least one portion of a key, where a value of the key varies over time, where the key is configured to enable decryption of encrypted information, where no single communication comprises an entirety of the key (601); and determining (e.g., by the second apparatus) a local version of the key based on the received portions of the key (602).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more additional aspects of the exemplary embodiments of the invention as described herein.

(8) In another exemplary embodiment, an apparatus comprising: at least one processor; and at least one memory including computer program code, the at least one memory and the computer program code being configured to, with the at least one processor, cause the apparatus at least to perform: receiving a plurality of communications from another apparatus, where each communication comprises at least one portion of a key, where a value of the key varies over time, where the key is configured to enable decryption of encrypted information, where no single communication comprises an entirety of the key; and determining a local version of the key based on the received portions of the key.

An apparatus as in any above, further comprising one or more additional aspects of the exemplary embodiments of the invention as described herein.

(9) In another exemplary embodiment, an apparatus comprising: means for receiving a plurality of communications from another apparatus, where each communication comprises at least one portion of a key, where a value of the key varies over time, where the key is configured to enable decryption of encrypted information, where no single communication comprises an entirety of the key; and means for determining a local version of the key based on the received portions of the key.

An apparatus as in any above, where the means for receiving comprises a receiver, a transceiver, a modem, reception circuitry, an integrated circuit or a communications component. An apparatus as in any above, where the means for determining comprises a processor, programmable logic, determination circuitry, an integrated circuit or a computer program. An apparatus as in any above, further comprising one or more additional aspects of the exemplary embodiments of the invention as described herein.

(10) In another exemplary embodiment, an apparatus comprising: reception circuitry configured to receive a plurality of communications from another apparatus, where each communication comprises at least one portion of a key, where a value of the key varies over time, where the key is configured to enable decryption of encrypted information, where no single communication comprises an entirety of the key; and determination circuitry configured to determine a local version of the key based on the received portions of the key.

An apparatus as in any above, further comprising one or more additional aspects of the exemplary embodiments of the invention as described herein.

(11) In another exemplary embodiment, a system comprising: the apparatus of (3) and the apparatus of (8); the apparatus of (4) and the apparatus of (9); or the apparatus of (5) and the apparatus of (10).

A system as in any above, further comprising one or more additional aspects of the exemplary embodiments of the invention as described herein.

(12) In another exemplary embodiment, a system comprising: one of the apparatus of (3), the apparatus of (4) and the apparatus of (5); and one of the apparatus of (8), the apparatus of (9) and the apparatus of (10).

A system as in any above, further comprising one or more additional aspects of the exemplary embodiments of the invention as described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

Still further, the various names and labels used for the parameters (e.g., $\mu$, $\lambda$, etc.) are not intended to be limiting in any respect, as these parameters may be identified by any suitable names.

The various blocks shown in FIGS. 5 and 6 may be viewed as method steps, as operations that result from operation of computer program code and/or as one or more coupled components (e.g., function blocks, circuits, integrated circuits, logic circuit elements) constructed to carry out the associated function(s). The blocks depicted in FIGS. 5 and 6 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 5 and 6 should be considered merely exemplary and non-limiting. It should be appreciated that the blocks depicted in FIGS. 5 and 6 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 5 and 6 so as to implement one or more further exemplary embodiments of the invention, such as those described in further detail herein.

That is, the non-limiting, exemplary embodiments of the invention shown in FIGS. 5 and 6 may be implemented, practiced or utilized in conjunction with one or more further aspects in any combination (e.g., any combination that is practicable, suitable and/or feasible) and are not limited only to the blocks, steps, functions and/or operations illustrated in FIGS. 5 and 6.

While described above in reference to bits, it should be appreciated that the exemplary embodiments of the invention are not limited thereto and may be used in conjunction with other techniques for expressing information (e.g., alphanumeric, hexadecimal, etc.). Usage of such other techniques may incur some restructuring of the scheme, for example, to account for the fact that individual elements of the key can take on more than two different values.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method comprising:
   storing a key on a storage medium of a first apparatus, where individual bits of a value of the key vary over time such that different portions of the key reflect different levels of trust between the first apparatus and a second apparatus, where the key is configured to enable decryption of encrypted information; and
   sending a plurality of communications from the first apparatus to the second apparatus, where each communication comprises at least one bit of the value of the key, where no single communication comprises an entirety of the key, and where a correctness of the at least one bit to enable the decryption is dependent on an elapsed time and a number of varied individual bits of the value of the key since the at least one bit was sent.

2. The method of claim 1, where the value of the key comprises a binary vector of the key, and where the varying over time comprises a binary value 0 or 1 of the individual bits of the binary vector of the stored key are flipped independently as time progresses.

3. The method of claim 2, where the key is configured to enable the decryption of the encrypted information only if a decryptor of the key is in possession of a sufficient percentage of correct bits of the value of the key, where the sufficient percentage of correct bits is set by a threshold value.

4. The method of claim 1, where the key comprises a series of values, where each portion of the key comprises at least one value and at least one indicator corresponding to a position of the at least one value within the key.

5. The method of claim 1, where the encrypted information is encrypted in accordance with a threshold-based encryption scheme having a threshold such that the encrypted information is configured to be decrypted only if a decryptor of the second apparatus is in possession of sufficient percentage of correct individual bits of the value of the key as compared to the threshold.

6. The method of claim 1, where the respective different levels of trust are inferred at different times from a number of electronic social interactions at the respective different time between the first apparatus and the second apparatus.

7. The method of claim 6, where a portion of the key corresponding to a most recent inferred level of trust is more significant for decrypting data as compared to another portion of the key corresponding to a least recent inferred level of trust.

8. The method of claim 1, where the communication sent to the second apparatus comprises a time vector indicating a time of a communication of the at least one bit of the key, and where the at least one bit of the key is configured to enable a computation of a probability of correctness of the at least one bit of the key using the time vector to determine whether to use the at least one bit of the key to attempt the decryption of encrypted information.

9. The method of claim 1, where the varying comprises flipping the individual bits, where the at least one bit is correct to enable the decryption if an even number of flips has occurred during an elapsed time since the at least one bit was sent, and where the at least one bit is not correct to enable the decryption if an odd number of flips has occurred during an elapsed time since the at least one bit was sent.

10. An apparatus comprising:
at least one data processor; and
at least one non-transitory memory including computer program code, the at least one memory and the computer program code being configured to, with the at least one data processor, cause the apparatus at least to perform:
storing a key, where individual bits of a value of the key vary over time such that different portions of the key reflect different levels of trust between the apparatus and another apparatus, where the key is configured to enable decryption of encrypted information; and
sending a plurality of communications from the apparatus to the another apparatus, where each communication comprises at least one bit of the value of the key, where no single communication comprises an entirety of the key, and where a correctness of the at least one bit to enable the decryption is dependent on an elapsed time and a number of varied individual bits of the value of the key since the at least one bit was sent.

11. The apparatus of claim 10, where the value of the key comprises a binary vector of the key, and where the varying over time comprises a binary value 0 or 1 of the individual bits of the binary vector of the stored key are flipped independently as time progresses.

12. The apparatus of claim 11, where the key is configured to enable the decryption of the encrypted information only if a decryptor is in possession of a sufficient percentage of correct individual bits of the value of the key, where the sufficient percentage of correct bits is set by a threshold value.

13. The apparatus of claim 10, where the key comprises a series of values, where each portion of the key comprises at least one value and at least one indicator corresponding to a position of the at least one value within the key.

14. A method comprising:
receiving, by a second apparatus, a plurality of communications from a first apparatus, where each communication comprises at least one portion of a key, where individual bits of a value of the key vary over time such that different portions of the key reflect different levels of trust between the first apparatus and the second apparatus, where the key is configured to enable decryption of encrypted information, where no single communication comprises an entirety of the key; and determining, by the second apparatus, a local version of the key based on the received portions of the key, and where a correctness of the at least one portion of the key to enable the decryption is dependent on an elapsed time and a number of varied individual bits of the value of the key since the at least one portion of the key was received.

15. The method of claim 14, where the value of the key comprises a binary vector of the key, and where the varying over time comprises a binary value 0 or 1 of the individual bits of the binary vector of the stored key are flipped independently as time progresses.

16. The method of claim 14, where the key comprises a series of values, where the at least one portion of the key comprises at least one value and at least one indicator corresponding to a position of the at least one value within the key.

17. The method of claim 14, where the key is configured to enable the decryption of the encrypted information only if a decryptor is in possession of sufficient percentage of correct individual bits of the value of the key, where the sufficient percentage of correct bits is set by a threshold value.

18. The method of claim 14, where the encrypted information is encrypted in accordance with a threshold-based encryption scheme having a threshold such that the encrypted information is configured to be decrypted only if a decryptor is in possession of a sufficient percentage of correct individual bits of the value of the key as compared to the threshold.

19. The method as in claim 14, further comprising: decrypting, by the second apparatus, the encrypted information using the determined local version of the key.

20. An apparatus comprising:
at least one data processor; and
at least one non-transitory memory including computer program code, the at least one memory and the computer program code being configured to, with the at least one data processor, cause the apparatus at least to perform:
receiving a plurality of communications from another apparatus, where each communication comprises at least one bit of a key, where individual bits of a value of the key vary over time such that different portions of the key reflect different levels of trust between the apparatus and the another apparatus, where the key is configured to enable decryption of encrypted information, where no single communication comprises an entirety of the key; and
determining a local version of the key based on the received portions of the key, and where a correctness of the at least one bit to enable the decryption is dependent on an elapsed time and a number of varied individual bits of the value of the key since the at least one bit was received.

21. The apparatus of claim 20, where the key comprises a series of values, where each portion of the key comprises at least one value and at least one indicator corresponding to a position of the at least one value within the key.

22. The apparatus of claim 20, where the key is configured to enable the decryption of the encrypted information only if a decryptor is in possession of a sufficient percentage of correct individual bits of the value of the key, where the sufficient percentage of correct bits is set by a threshold value.

23. The apparatus of claim 20, the at least one non-transitory memory and the computer program code being configured to, with the at least one data processor, cause the apparatus at least to further perform: decrypting the encrypted information using the determined local version of the key.

* * * * *